United States Patent [19]
Naito

[11] Patent Number: 5,119,298
[45] Date of Patent: Jun. 2, 1992

[54] HUNTING SUPPRESSIVE POWER DISTRIBUTION CONTROL SYSTEM FOR AUTOMOTIVE VEHICLE WITH FOUR WHEEL DRIVE POWER TRAIN LAYOUT

[75] Inventor: Genpei Naito, Kanagawa, Japan
[73] Assignee: Nissan Motor Company, Limited, Yokohama, Japan
[21] Appl. No.: 452,832
[22] Filed: Dec. 21, 1989
[30] Foreign Application Priority Data
Dec. 23, 1988 [JP] Japan .................... 63-325379
[51] Int. Cl.$^5$ ........................... B60K 17/344
[52] U.S. Cl. ................. 364/426.02; 180/248; 180/197
[58] Field of Search .......... 364/426.02, 426.03, 364/424.1; 180/197, 233, 248, 249

[56] References Cited
U.S. PATENT DOCUMENTS

| | | | |
|---|---|---|---|
| 4,849,891 | 7/1989 | Krohn et al. | 180/197 |
| 4,874,056 | 10/1989 | Naito | 180/233 |
| 4,986,388 | 1/1991 | Matsuda | 180/233 |
| 5,002,147 | 3/1991 | Tezuka et al. | 364/426.02 |
| 5,010,974 | 4/1991 | Matsuda | 180/233 |
| 5,014,809 | 5/1991 | Matsuda | 180/197 |

Primary Examiner—Gary Chin
Attorney, Agent, or Firm—Foley & Lardner

[57] ABSTRACT

A power distribution control system system takes a strategy for adjusting power distribution to vary control mode in order to avoid influence of variation of wheel speed difference between a primary driving wheel directly or permanently connected to a vehicular prime mover, i.e. an automotive internal combustion engine and thus having greater inertia and an auxiliary driving wheel having smaller inertia. For this, occurrence of hunting in power distribution control is detected. As long as hunting is not detected, the wheel speed difference dependent power distribution control mode is selected for controlling power distribution depending upon a wheel speed difference between the primary and auxiliary wheels. On the other hand, when the hunting in wheel speed difference dependent power distribution control is detected, the control mode is switched from the wheel speed difference dependent power distribution control mode to the vehicular acceleration dependent power distribution control mode in which power distribution control is derived on the basis of the vehicular acceleration.

28 Claims, 5 Drawing Sheets

HUNTING SUPPRESSIVE POWER DISTRIBUTION CONTROL SYSTEM FOR AUTOMOTIVE VEHICLE WITH FOUR WHEEL DRIVE POWER TRAIN LAYOUT

BACKGROUND OF THE INVENTION

1. Field of the Invention

The present invention relates generally to a power distribution control system for four wheel drive vehicle. More specifically, the invention relates to a technology for preventing the power distribution control system from causing hunting in adjusting proportion of power distribution for front and rear wheels.

2. Background of the Invention

Japanese Patent First (unexamined) Publication (Tokkai) Showe 61-157437 discloses a power distribution control system for a four wheel drive vehicle. The power distribution control system disclosed in this prior publication, proposes power distribution control for prevention of wheel spin, unbalanced wheel lock at left and right sides of the vehicle during abrupt braking, wheel slippage on low friction road and so forth. In the disclosed system, power distribution is adjusted on the basis of wheel speed difference between primary and auxiliary driving wheels, i.e. front and rear wheels. That is, when the wheel speed difference becomes greater, the proportion of power distribution for the auxiliary driving wheels is increased toward an even ratio to the primary driving wheels, and a smaller wheel slip difference results in smaller proportion of driving power to be distributed to the auxiliary driving wheels.

In such prior proposed power distribution control systems, power distribution is controlled in a feedback system with taking the wheel speed difference between the primary and auxiliary driving wheels as feedback parameter. A problem has been encountered at the occurrence of four wheel slippage. In such occasion, since wheel speed difference fluctuates depending upon the power distribution ratio for the auxiliary wheels because of substantially equal magnitude of wheel slippage at both of primary and auxiliary driving wheels. Fluctuation of wheel speed difference results in variation of the power distribution ratio for the primary and auxiliary driving wheels. Hunting is thus caused. Hunting results in self-induced noise or jerking of the vehicle.

For example, when the vehicle has a power train layout taking a rear wheel as a primary driving wheel, and abrupt acceleration is demanded on the low friction road, wheel slippage at rear wheels increases abruptly to increase the wheel speed difference. According to an increasing of wheel speed difference, a change of the power distribution ratio for increasing power distribution for the front wheel as the auxiliary driving wheel is commanded. Since the front wheel has substantially small inertia, wheel speed at the front wheel is rapidly increased. Therefore, such change of power distribution is taken place abruptly for rapidly decreasing wheel slippage difference. This results in abrupt change of power distribution ratio for decreasing distribution ratio for the auxiliary driving wheel. An abrupt change of power distribution causes recovery of traction at the front wheel thereby causing an abrupt drop of the wheel speed at the front wheel. Therefore, again, the wheel speed difference at front and rear wheels is abruptly increased.

The tendency of causing hunting as set forth above may be increased when control gain for wheel speed difference dependent power distribution control is increased. On the other hand, if the control gain is reduced, response ability in wheel speed difference dependent power distribution control can be lowered for degrading vehicular acceleration characteristics and vehicular driving stability.

SUMMARY OF THE INVENTION

Therefore, it is an object of the present invention to provide a power distribution control system which effectively prevents or suppresses hunting in power distribution control.

Another object of the invention is to provide a power distribution control system which is variable of control mode depending upon the vehicular driving condition so that variation of wheel speed difference which otherwise causes hunting in power distribution control, will not influence the adjusting power distribution for the primary and auxiliary driving wheels.

In order to accomplish the aforementioned and other objects, a power distribution control system, according to the present invention, takes a strategy for adjusting power distribution to vary control mode in order to avoid influence the variation of wheel speed difference between a primary driving wheel directly or permanently connected to a vehicular prime mover, i.e. an automotive internal combustion engine and thus having greater inertia and an auxiliary driving wheel having smaller inertia. For this, occurrence of hunting in power distribution control is detected. As long as hunting is not detected, wheel speed difference dependent power distribution control mode is selected for controlling power distribution depending upon a wheel speed difference between the primary and auxiliary wheels. On the other hand, when the hunting in wheel speed difference dependent power distribution control is detected, the control mode is switched from the wheel speed difference dependent power distribution control mode to the vehicular acceleration dependent power distribution control mode in which power distribution control is derived on the basis of the vehicular acceleration.

According to one aspect of the invention, a system for controlling the distribution of output power of an internal combustion engine to a primary driving wheel which is permanently connected to an engine output for permanently being driven by the engine output power, and a secondary driving wheel which is connected to the engine output via a transfer unit so as to be releasably connected to the engine output for receiving distribution of the engine output at a controlled ratio, which controlling system comprises first means, associated with the transfer unit, for operating the latter in a controlled magnitude for adjusting the distribution ratio of the engine output power for the secondary wheel at a ratio defined by a power distribution control signal; second means for monitoring wheel slippage at least at the primary driving wheel for generating a wheel slippage magnitude representative data; third means for monitoring vehicular acceleration and deceleration for generating a vehicular acceleration state indicative data which is representative of magnitude of vehicular acceleration and deceleration; and fourth means, receiving the wheel slippage representative data and the vehicular acceleration indicative data for deriving the power distribution control signal by selectively utilizing one of the wheel slippage representative data and the vehicular acceleration indicative data, the fourth means selecting the wheel slippage representative data for deriving the control signal in a normal state of control and selecting the vehicular acceleration indicative data for deriving the control signal when hunting of power distribution control due to fluctuation of wheel slippage is detected.

The power distribution control system may further comprise a fifth means for monitoring vehicular rolling state for generating a vehicular rolling indicative signal representative of magnitude of the rolling, and the fourth means operating for deriving the power distribution control signal utilizing the vehicular acceleration indicative data, is responsive to the vehicular rolling indicative signal for modifying the power distribution control signal for reducing power distribution for the secondary driving wheel at a predetermined rate according to an increase in magnitude of vehicular rolling.

The fourth means may detect hunting in power distribution control on the basis of a variation of the power distribution control signal, or in the alternative, on the basis of a variation of wheel slippage versus a vehicle body speed as monitored by means of a vehicle body speed sensor.

The transfer unit preferably employs a friction clutch unit which is disposed between the engine output and the secondary driving wheel and variable of engaging torque depending upon the power distribution control signal for adjusting the distribution ratio of the engine output power.

According to another aspect of the invention, a system for controlling distribution of an output power of an internal combustion engine to a primary driving wheel which is permanently connected to an engine output for permanently being driven by the engine output power, and a secondary driving wheel which is connected to the engine output via a transfer unit so as to be releasably connected to the engine output for receiving distribution of the engine output at a controlled ratio, which controlling system comprises first means, associated with the transfer unit, for operating the latter in a controlled magnitude for adjusting the distribution ratio of the engine output power for the secondary wheel at a ratio defined by a power distribution control signal; second means for monitoring the wheel speed at primary and secondary driving wheels at least at the primary driving wheel for generating primary and secondary driving wheel speed representative data; third means for monitoring a longitudinal acceleration exerted on the vehicle body for generating a longitudinal acceleration indicative data which is representative of the magnitude of longitudinal acceleration; and fourth means, receiving the primary and secondary driving wheel speed representative data and the longitudinal acceleration indicative data, for deriving the power distribution control signal by selectively utilizing one of a wheel slippage derived on the basis of the primary and secondary driving wheel speed representative data and the longitudinal acceleration indicative data, the fourth means selecting the wheel slippage for deriving the control signal in a normal state of control and selecting the longitudinal acceleration indicative data for deriving the control signal when the state of occurrence of wheel slippage at both of the primary and secondary driving wheels is detected.

The power distribution control system may further comprise a fifth means for monitoring lateral acceleration exerted on the vehicle body for generating a lateral acceleration indicative data representative of magnitude thereof, and the fourth means derives the power distribution control signal utilizing the longitudinal acceleration indicative data when the lateral acceleration representative data is smaller than a predetermined threshold value and derives the power distribution control signal on the basis of the longitudinal acceleration representative data and the lateral acceleration indicative data when the lateral acceleration representative data is greater than or equal to the predetermined threshold value.

The fourth means may detect an occurrence of wheel slippage at both of the primary and secondary driving wheels on the basis of variation of the power distribution control signal, or on the basis of variation of wheel speed at primary and secondary driving wheels versus a vehicle body speed as monitored by means of a vehicle body speed sensor.

According to a further aspect of the invention, a method for controlling distribution of an output power of an internal combustion engine to a primary driving wheel which is permanently connected to an engine output for permanently being driven by the engine output power, and a secondary driving wheel which is connected to the engine output via a transfer unit so as to be releasably connected to the engine output for receiving distribution of the engine output at a controlled ratio, which controlling system comprises the steps of monitoring wheel slippage at least at the primary driving wheel for generating a wheel slippage magnitude representative data; monitoring vehicular acceleration and deceleration for generating a vehicular acceleration state indicative data which is representative of magnitude of vehicular acceleration and deceleration; receiving the wheel slippage representative data and the vehicular acceleration indicative data for deriving the power distribution control signal by selectively utilizing one of the wheel slippage representative data and the vehicular acceleration indicative data, in which the wheel slippage representative data is selected for deriving the control signal in a normal state of control and the vehicular acceleration indicative data is selected for deriving the control signal when hunting of power distribution control due to fluctuation of wheel slippage is detected; and operating the latter in a controlled magnitude for adjusting the distribution ratio of the engine output power for the secondary wheel at a ratio defined by a power distribution control signal.

BRIEF DESCRIPTION OF THE DRAWINGS

The present invention will be understood more fully from the detailed description given herebelow and from the accompanying drawings of the preferred embodiment of the present invention, which, however, should not be taken to limit the invention to the specific embodiment, but are for explanation and understanding only.

In the drawings.

DESCRIPTION OF THE PREFERRED EMBODIMENT

Figure 1:
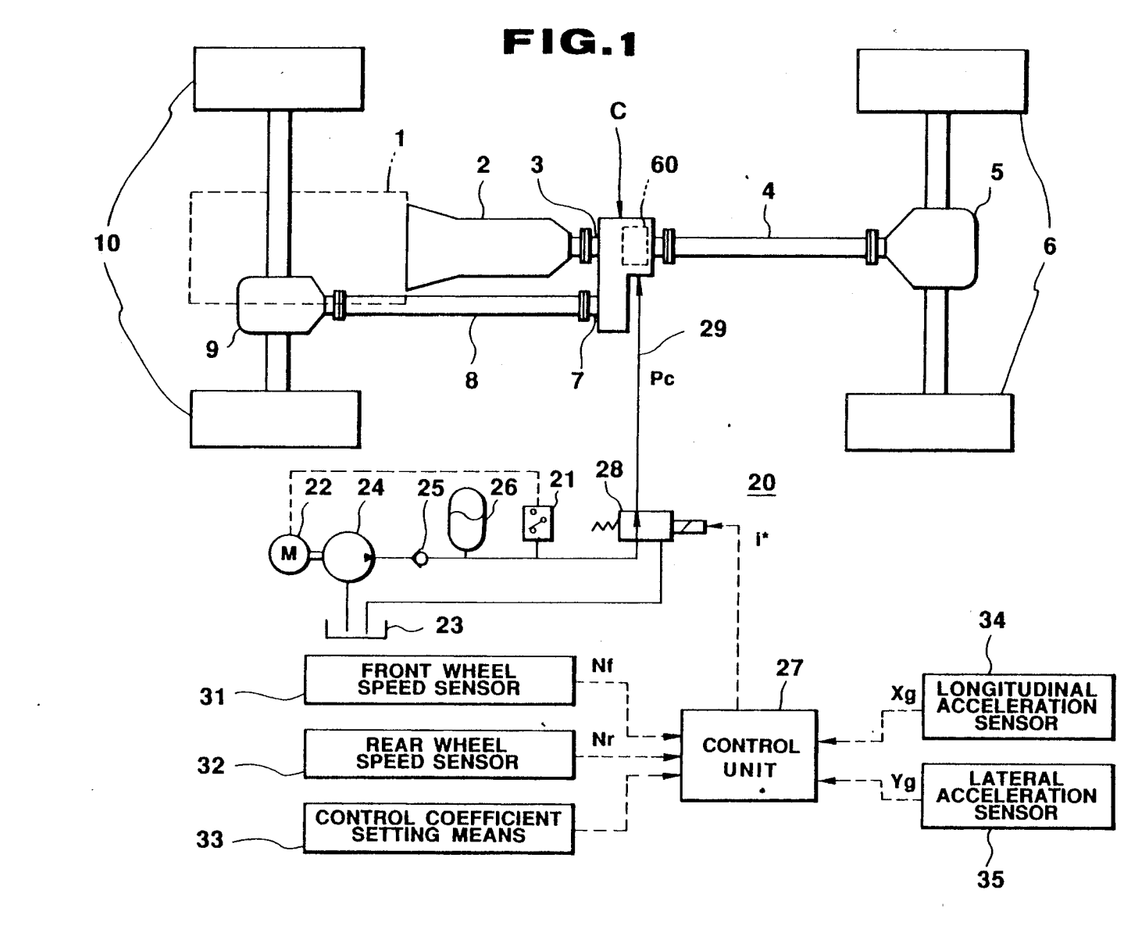
FIG. 1 is a diagrammatic illustration of the preferred embodiment of a power distribution control system according to the present invention.

Referring now to the drawings, particularly to FIG. 1, the preferred embodiment of a power distribution control system, according to the present invention, will be discussed in terms of application for a four wheel drive vehicle which has a power train layout taking rear wheels 6 as primary driving wheels and front wheels 10 as auxiliary driving wheel. Note should be made that, in the shown power train layout, the rear wheel 6 as the primary driving wheel, is permanently connected to an automotive prime mover 1, i.e. an automotive internal combustion engine and thus has substantial inertia moment. Namely, the engine 1, as the prime mover, is connected to the rear wheels 6 via a power transmission 2, a transfer input shaft 3, a transfer unit C, a rear propeller shaft 4 and a rear differential gear unit 5 as a final drive. On the other hand, the engine 1 is also connected to the front wheels 10 via the power transmission 2, the transfer input shaft 3, the transfer unit C, a transfer output shaft 7, a front propeller shaft 8 and a front differential gear unit 9, as a final drive.

The transfer unit C employed in the shown embodiment is of the hydraulically operated type and thus associated with a hydraulic unit 20 for controlling the proportion of power distribution between the front and rear wheels 10 and 6. The hydraulic unit 20 thus modulates a control pressure Pc to be supplied to the transfer unit C in order to adjust the engaging force in the transfer unit and whereby adjust the power distribution. The hydraulic unit 20 includes an electric motor 22 drivingly associated with a fluid pump 24 which sucks working fluid in a fluid reservoir 23. The discharge port of the fluid pump 24 is connected to a pressure accumulator 26 via an one-way check valve 25. Therefore, a primary pressure generated in the fluid pump 24 is discharged through the discharge port and thus accumulated in the pressure accumulator 26. The pressure accumulator 26 is connected to a control chamber in the transfer unit C via an electromagnetic proportioning valve 28 and a control line 29.

The electromagnetic proportioning valve 28 has an electrically operable actuator connected to a control unit 27 which is designed for generating a power distribution control signal I* for modulating a line pressure Pc as the control pressure, supplied to the transfer unit C. The transfer unit C is thus operated for adjusting power distribution for the front wheel versus the power distributed to the rear wheels.

The control unit 27 comprise a microprocessor which is programmed for performing power distribution control based on a difference of front and rear wheel speeds in a wheel speed dependent distribution control mode. The control unit 27 is further operative for performing power distribution control depending upon a longitudinal acceleration exerted on the vehicular body in an acceleration dependent distribution control mode. In order to enable the control unit 27 to perform power distribution control, front wheel speed sensor 31, a rear wheel speed sensor 32, a longitudinal acceleration sensor 34 and a lateral acceleration sensor 35 are provided for providing power distribution control parameters. The front and rear wheel speed sensors 31 and 32 are designed for monitoring rotation speed of front and rear wheels so as to produce front and rear wheel speed indicative signals $N_f$ and $N_r$. The longitudinal acceleration sensor 34 monitors a longitudinal acceleration to produce a longitudinal acceleration indicative signal $X_g$. Similarly, the lateral acceleration sensor 35 monitors lateral acceleration exerted on the vehicular body for producing a lateral acceleration indicative signal $Y_g$. The control system further comprises a control constant setting means 33 which permits entry of a selection command for selecting one of a plurality of preset control constants so as to select variation characteristics of power distribution ratio for the front wheels 10 in the wheel speed dependent distribution control mode.

Figure 3:
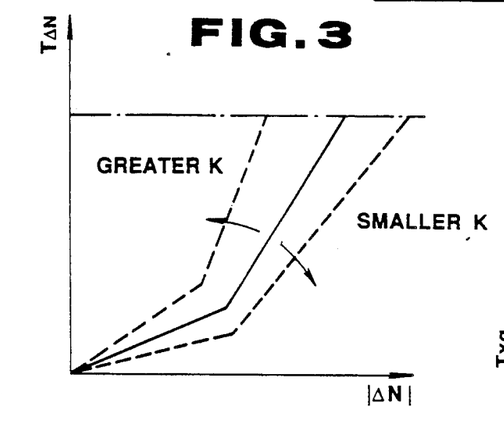
FIG. 3 is a chart showing the variation of engaging force of a clutch in the transfer device of FIG. 2, in relation to a difference of wheel speed at a primary and a auxiliary driving wheel.
Figure 4:
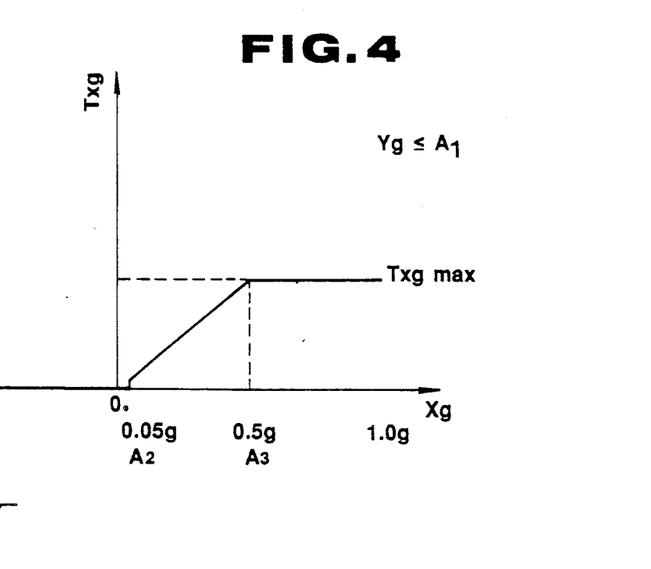
FIGS. 4 and 5 are charts showing variation of engaging force of the clutch in the transfer device of FIG. 2, in relation to a longitudinal acceleration on the vehicle.
Figure 5:
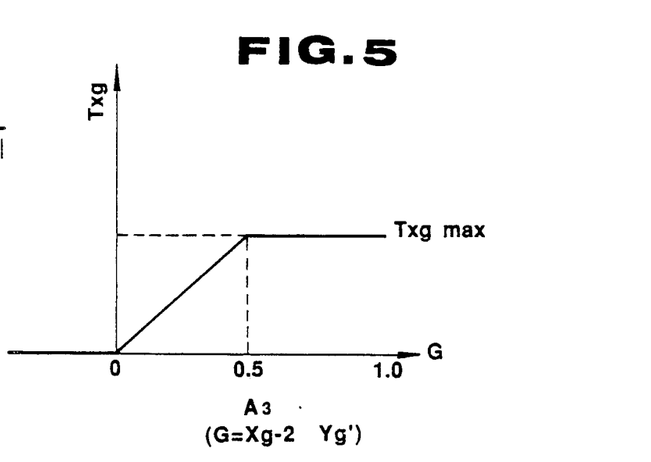

In the practical control, the wheel speed dependent distribution control is normally selected for performing distribution control for the engine output power depending upon a difference $\Delta N$ of the front and rear wheel speed indicative signals $N_f$ and $N_r$. The variation characteristics of power distribution for the front wheel 10 versus the absolute value of the wheel speed difference $|\Delta N|$ is shown in FIG. 3. As can be seen from FIG. 3, the power distribution variation characteristics is variable depending upon the control constant K selected by the control constant setting means 33. Therefore, according to increasing of the wheel speed difference $\Delta N$, the value of the power distribution control signal I* varies in order to adjust engaging force of a power distribution control clutch assembly 60 in the transfer unit C. On the other hand, when hunting in power distribution control is detected, the control mode is switched into acceleration dependent distribution control mode. In this case, two different control characteristics as shown in FIGS. 4 and 5 may be selectively used. Namely, the control characteristics of FIG. 4 is set as function of the longitudinal acceleration $X_g$ so that power distribution ratio for the front wheels 10 increases according to an increase in magnitude of the longitudinal acceleration. On the other hand, the control characteristics of FIG. 5 is set for varying the power distribution according to a value G derived by subtracting a lateral acceleration factor from the longitudinal acceleration. In practice, the value G is derived from the following equation:

$$G = X_g - 2Y_g$$

As can be seen from FIG. 5, the power distribution ratio is proportional to the value G.

The control characteristics of FIG. 4 may be selected while the vehicle travels straight. On the other hand, when the vehicle is in cornering, the control characteristics of FIG. 5 may be selected. Namely, while the vehicle travels straight, the influence of hunting on riding comfort and drivability becomes significant, therefore, by utilizing longitudinal acceleration as the sole parameter for adjusting power distribution, hunting can be successfully avoided. On the other hand, as can be appreciated, since a greater proportion of power distribution to the front wheel can increase under steering characteristics, an excessive magnitude of drive power distributed to the front wheel may degrade cornering ability. In view of this, the power distribution ratio to the front wheel is lowered by a factor dependent upon lateral acceleration for better balance of power distribution and improved cornering ability.

Figure 2:
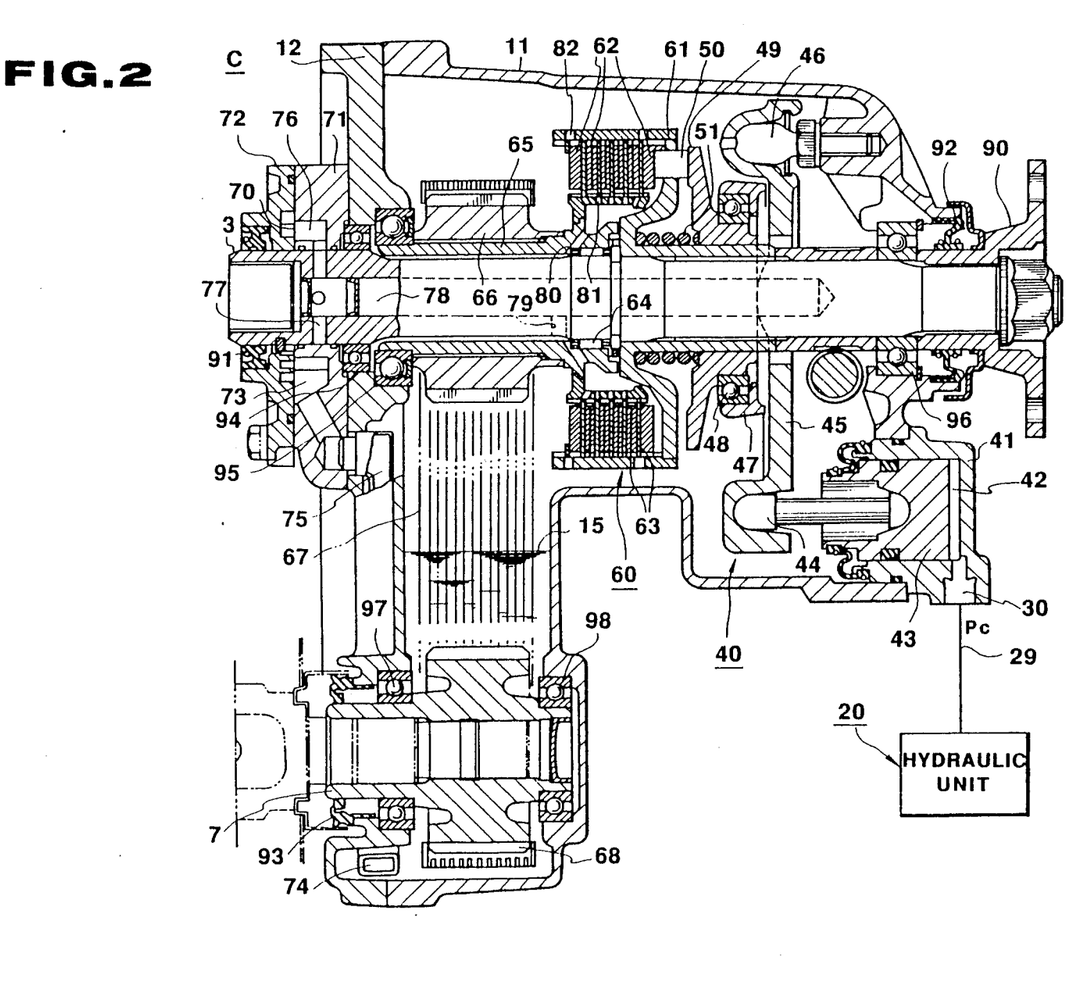
FIG. 2 is a section of a transfer device employed in the preferred embodiment of the power distribution control system of FIG. 1.

As shown in FIG. 2, the transfer unit C comprises an actuation mechanism which is generally represented by the reference numeral 40 and responsive to the line pressure Pc introduced through an inlet port 30 for adjusting the engaging force of a multi-plate wet-type clutch assembly 60. The transfer unit C further has a lubricating system which includes a lubricant pump 70 for introducing lubricant 15 within a transfer casing 11 and the casing cover 12 into the inside of the clutch assembly 60.

The actuation mechanism 40 includes a cylinder block 41, a piston chamber 42, a piston 43 disposed within the piston chamber, a piston rod 44, a swing plate 45, a swing pin 46, a stationary pusher plate 47, a bearing 48, a rotatable pusher plate 49, a pusher block 50 and a return spring 51.

The clutch assembly 60 has a clutch drum 61 which is splined to the input shaft 3 of the transfer unit 3, a pair of drive plates 62 splined to the clutch drum, a plurality of driven plates 63 disposed between the drive plates, and a clutch hub 65, to which the driven plates 63 are splined. The clutch hub 65 is rotatably supported on the input shaft 3 by means of a needle bearing 64. The clutch hub 65 carries a first sprocket 65 which is drivingly connected to a second sprocket 68 rigidly connected to the output shaft 7, by means of a drive chain 67.

The lubricant pump 70 comprises a toroidal pump formed by a pump housing 71 which is fitted to the casing cover 12 in the vicinity of the inlet of the input shaft 3, and a pump cover 72. The pump 70 has an induction port 73 connected to a suction tube 75. The suction tube 75 has a suction opening 74. The pump 70 also has a discharge port 76 in communication with an axial path 78 axially defined through the input shaft 3, via a radial path 77. The axial path 78 is communicated with the inside of the clutch assembly 60 via radial paths 80 and 81. With the shown construction, the lubricant stored within the lower portion of the transfer casing is sucked and supplied to the clutch assembly 60 for lubrication and cooling. The lubricant is then drained through a drain hole 82 formed through the clutch drum 61.

In FIG. 2, the reference numeral 90 denotes a joint flange, 91, 92 and 93 respectively denote seals and 94, 95, 96, 97 and 98 respectively denote bearings.

Figure 6:
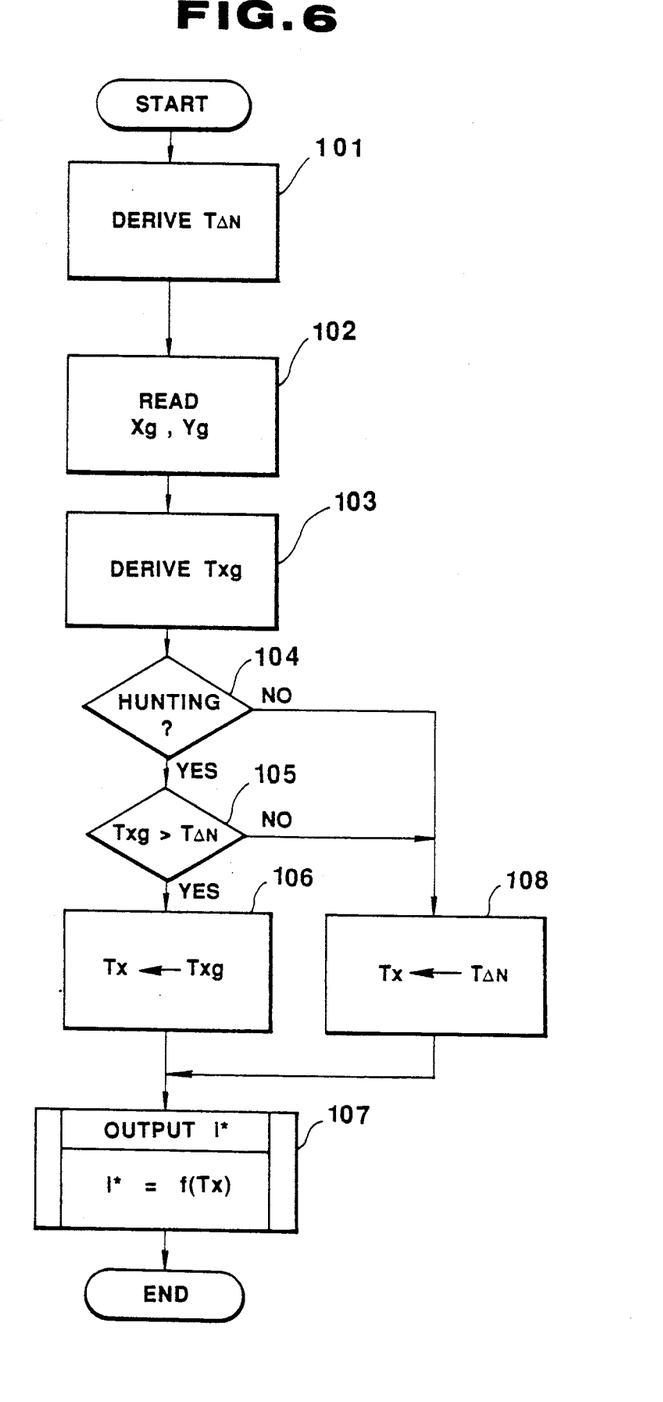
FIG. 6 is a flowchart showing a routine for controlling power distribution, which routine is executed by a control unit in the preferred embodiment of the power distribution control system of the invention.

The operation in controlling driving power distribution for the rear wheels 6 as the primary driving wheels and the front wheels 10 as the secondary driving wheels will be discussed herebelow with reference to FIG. 6, which illustrates a flowchart of a power distribution control program to be executed by the control unit 27. The shown routine may be triggered periodically or cyclically with a predetermined time interval or intervals. In the typical modern automotive technologies, a single control module is used for performing various mutually distinct control function, such as an engine control, transmission control, brake control and so forth in a time sharing basis as governed by a timing control background job as a main routine. Therefore, the shown routine may be regarded as part of such mutually distinct routines and triggered at every predetermined timing by the background job.

At a step 101, the front and rear wheel speed indicative signals $N_f$ and $N_r$ from the front and rear wheel speed sensors 31 and 32 are read out. Then, on the basis of the front and rear wheel speed indicative signals $N_f$ and $N_r$, the wheel speed difference $\Delta N$ is calculated. A wheel speed dependent engaging force $T_N$ for adjusting engaging force at the clutch assembly 60 and whereby determines slip in the clutch assembly for adjusting power distribution for the front wheels 10 as the secondary driving wheel. The wheel speed difference dependent engaging force $T_N$ is practically determined by looking-up a table as explanatorily illustrated in FIG. 4, set in terms of the absolute value of the wheel speed difference $|\Delta N|$ and the set control constant K.

At a step 102, the longitudinal acceleration indicative signal $X_g$ input from the longitudinal acceleration sensor 34 is read out. Also, the lateral acceleration indicative signal $Y_g$ from the lateral acceleration sensor 35 is read out. Then, at a step 103, an acceleration dependent engaging force $T_{xg}$ is derived on the basis of the longitudinal acceleration indicative signal value $X_g$ and the lateral acceleration indicative signal value $Y_g$. In practice, two mutually distinct characteristics as illustrated in FIGS. 4 and 5 are selectively used. Selection of the characteristics to be used is made on the basis of the magnitude of the longitudinal acceleration $X_g$ and the magnitude of the lateral acceleration $Y_g$. Practically, the acceleration dependent engaging force $T_{xg}$ is determined according to the characteristics of FIG. 4 when the vehicle travels substantially in a straight direction and according to the characteristics of FIG. 5 when the vehicle is cornering.

In the case that the characteristics of FIG. 4 is selected, the engaging force $T_{xg}$ is derived as follows in terms of the lateral acceleration $Y_g$ and the longitudinal acceleration $X_g$:

if $Y_g$ is greater than a predetermined a lateral acceleration threshold $A_1$ which may represent the vehicular rolling criterion, $T_{xg}$ is set to zero;

if $Y_g$ is smaller than or equal to $A_1$, and $X_g$ is greater than or equal to $A_3$ (0.5 g), $T_{xg}$ is set at predetermined maximum value $T_{xgmax}$ for maximum rate of distribution of the driving power for the front wheels;

if $Y_g$ is smaller than or equal to $A_1$ and $X_g$ is greater than $A_2$ (0.05 g) but smaller than $A_3$, $T_{xg}$ increases linearly according to the increasing of $X_g$ with taking $K_{xg}$ as a coefficient which defines the gradient as seen from FIG. 4; and if $X_g$ is smaller than or equal to $A_2$, $T_{xg}$ is set to zero.

As will be appreciated, the influence of hunting in power distribution control becomes significant during abrupt acceleration on a relative low friction road. Therefore, when the longitudinal acceleration $X_g$ is smaller than or equal to zero, which represents vehicular decelerating state, to when the longitudinal acceleration is greater than or equal to zero and smaller than or equal to $A_2$, which represents vehicular moderate acceleration state, the acceleration dependent engaging force $T_{xg}$ is set at zero.

On the other hand, if the longitudinal acceleration $X_g$ becomes greater than equal to $A_3$ which occurs only on relatively high friction road, wheel spinning at four wheels can rarely be caused. Therefore, hunting in power distribution control will never occur. For this reason, the engaging force is set at the predetermined maximum value $T_{xgmax}$. When the longitudinal acceleration $X_g$ is between $A_2$ and $A_3$, the engaging force $T_{xg}$ is increased according to an increase in longitudinal acceleration. The proportional constant or coefficient $K_{xg}$, is derived so that the engaging force $T_{xg}$ for providing maximum torque transmission to the road through the front wheel can be obtained with the assumption that the longitudinal acceleration equals the road friction coefficient. Namely, the transmitted torque $T_F$ on the propeller shaft for the front wheels 10 in the ideal power distribution can be expressed by:

$$T_F = \mu \times \{W_f^{\%} - (H/L) \times \mu\} \times W \times (r/i_f) \quad (1)$$

where
$\mu$ is road friction coefficient;
W is weight of the vehicle
H is height of the vehicular gravity center
L is wheel base
r is a radius of tire;
$i_f$ is a final reduction ratio; and
$W_f^{\%}$ is a weight ratio at the front.

When wheel spin is caused at all four wheels to cause hunting in power distribution, the longitudinal acceleration $X_g$ becomes substantially equal to the road friction coefficient $\mu$. Therefore, the foregoing equation can be modified as:

$$T_F = X_g \times \{W_f^{\%} - (H/L) \times \mu\} \times W \times (r/i_f) \quad (2)$$

Here, since the hunting is caused at a low friction road, the longitudinal acceleration has to be relatively small. If the longitudinal acceleration is assumed to be sufficiently small, the transmitted torque $T_F$ can be approximately expressed as follows:

$$T_f = X_g \times (W_f^{\%} \times W \times (r/i_f))$$

Therefore, in such case, $K_{xg}$ can be expressed by $$K_{xg} = W_f^{\%} \times W \times (r/i_f)$$

On the other hand, when the lateral acceleration $Y_g$ is greater than $A_1$, judgement can be made that the vehicle is in cornering. If power distribution is then controlled for establishing a rigid four wheel drive layout by providing a substantial engaging force $T_{xg}$, understeer characteristics of the vehicle become substantial for degrading vehicular cornering ability. In addition, at the cornering, since wheel spinning is caused at inner side wheels in advance of causing spinning at the outside wheels, hunting in power distribution control will never occur.

When the characteristics of FIG. 5 is selected, the engaging force $T_{xg}$ is generally increased according to increasing of the longitudinal acceleration. However, in this characteristics, the engaging force is decreased according to increasing of the lateral acceleration $Y_g$. In order to achieve this, a lateral acceleration dependent value $Y_g'$ is derived as follows:
if $Y_g$ is greater than 0.1 g, $Y_g' = Y_g - 0.1$; and
if $Y_g'$ is smaller than or equal to 0.1 g, $Y_g = 0$
Based on the lateral acceleration dependent value $Y_g'$, an acceleration dependent parameter value G can be expressed in terms of the longitudinal acceleration $X_g$ and the lateral acceleration $Y_g'$, as follows:

$$G = X_g - K \times Y_g' \quad (K = 2.0)$$

By utilizing the constant K, higher response ability to variation of the lateral acceleration can be obtained.

In terms of the acceleration dependent parameter value G derived as set forth above, the engaging force $T_{xg}$ can be obtained according to the following formulae:

$$G \leq 0; \quad T_{xg} = m0$$

$$0 < G < A_3; \quad T_{xg} = K_{xg} \times G$$

$$A_3 \leq G; \quad T_{xg} = T_{xgmax}$$

After deriving the engaging force $T_{xg}$ through the process set forth above at the step 103, a check is performed to determine whether hunting of power distribution control is indeed occurring or not, at a step 104. In practice, hunting in power distribution control can be detected by monitoring the control signal value supplied for the transfer unit C. In the alternative, it is also possible to detect wheel slippage at every wheel by comparing the wheel speed as measured by means of the wheel speed sensor with a vehicular body speed which may be monitored by means of a vehicle speed sensor.

When occurrence of hunting is detected at the step 104, the acceleration dependent engaging force $T_{xg}$ as derived at the step 103 is compared with the wheel speed difference dependent engaging force $T_N$, at a step 105. If the acceleration dependent engaging force $T_{xg}$ is greater than the wheel speed difference dependent engaging force $T_N$, the acceleration dependent engaging force $T_{xg}$ is derived as an engaging force command $T_x$ to be supplied to the transfer unit C as the control signal. On the other hand, if the hunting stats is not detected at the step 104 or if the wheel speed difference dependent engaging force is greater than the acceleration dependent engaging force $T_{xg}$, the process goes to a step 108, in which the power distribution command is derived on the basis of the wheel speed difference depending engine power distribution rate. Based on the engaging force $T_N$ derived at either the step 107 and the step 108, the power distribution control signal I* in a form of a direct current signal, is output at a step 109.

In the practical operation, when the vehicle travels on a high friction road, where no wheel slippage occurs, hunting in the power distribution control is rarely caused. Therefore, in the normal state, the engaging force $T_N$ of the clutch assembly 60 of the transfer unit C is derived on the basis of the wheel speed difference dependent characteristics of FIG. 4. As set out above, in this mode, the engaging force $T_N$ is increased according to the increase in the difference of the wheel speed between the front and rear wheels 10 and 6.

Therefore, according to the increasing of the wheel speed difference between the front wheel speed $N_f$ and the rear wheel speed $N_r$, the power distribution ratio for the front wheel 10 is increased. By this, road/tire traction can be maintained at high level so that optimal torque transmission to the road via the wheel can be achieved for better vehicle driving performance.

Figure 7:
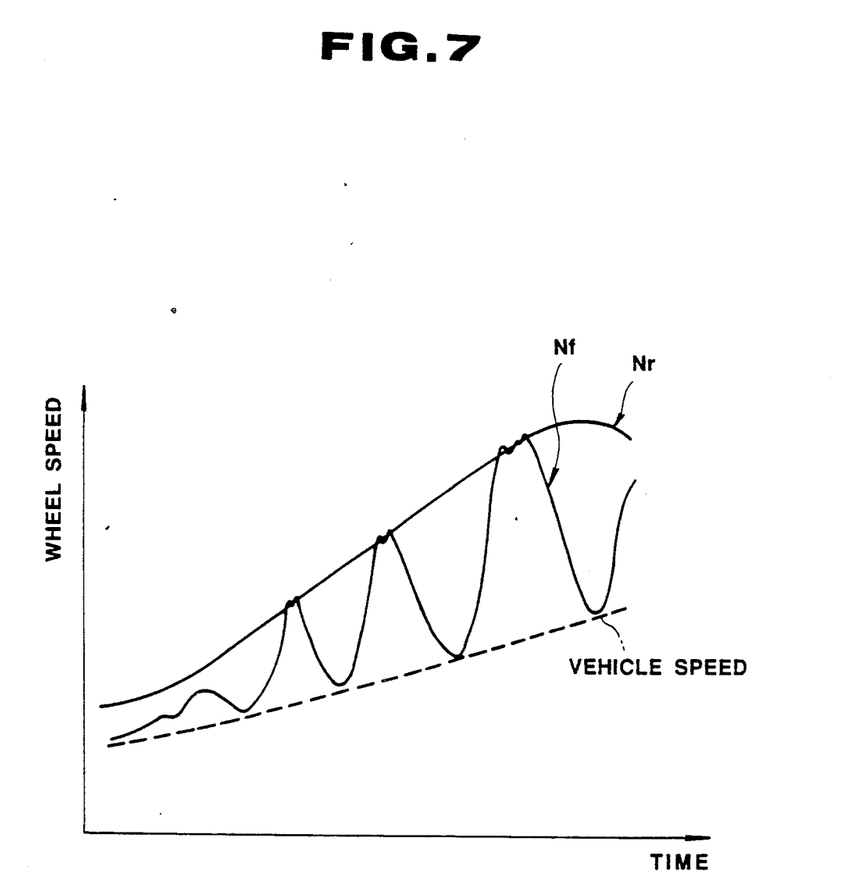
FIG. 7 is a timing chart showing operation of power distribution control at low friction road.

On the other hand, when the wheel slippage occurs at every four wheels, hunting is caused in the power distribution control. Then, the control mode is switched into the hunting suppressive control mode. In this mode of control, the characteristics of FIG. 4 and FIG. 5 is selectively used depending upon the magnitude of the lateral acceleration $Y_g$ and the longitudinal acceleration $X_g$, as set forth above. Namely, at low friction road, due to presence of inertial difference between the front and rear wheels, the front wheels 10 having smaller inertia fluctuates the wheels speed in substantial amplitude, as illustrated by line $N_f$ in FIG. 7. This leads hunting in control of power distribution. Therefore, when hunting is detected, the wheel speed difference dependent power distribution control is ceased and acceleration, i.e. lateral and longitudinal accelerations, dependent power distribution becomes active.

In the hunting suppressive mode of power distribution control, the engaging force of the clutch unit 60 in the transfer unit C is generally determined on the basis of the longitudinal acceleration $X_g$. As long as the vehicle travels in a straight direction, the longitudinal acceleration $X_g$ is taken as the sole parameter for deriving the engaging force of the clutch unit 60. On the other hand, when the vehicle is cornering, the engaging force as derived on the basis of the longitudinal acceleration $X_g$ is reduced in a magnitude variable depending upon the magnitude of this lateral acceleration $Y_g$. By taking this strategy, under-steer characteristics in the cornering can be reduced for improving cornering ability.

As will be appreciated herefrom, the present invention fulfills all of the objects and advantages sought therefor.

While the present invention has been disclosed in terms of the preferred embodiment in order to facilitate better understanding of the invention, it should by appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A system for controlling distribution of an output power of an internal combustion engine to a primary driving wheel, which is permanently connected to the engine output, for being driven by the engine output power, and a secondary driving wheel, which is connected to said engine output via a transfer unit so as to be releasably connected to said engine output, for receiving a portion of said engine output at a controlled distribution ratio, said controlling system comprising:

first means, associated with said transfer unit, for operating said transfer unit in a controlled magnitude for adjusting a distribution ratio of said engine output power to said secondary wheel to a ratio defined by a power distribution control signal;

second means for monitoring wheel slippage at least at said primary driving wheel and for generating a wheel slippage magnitude representative data;

third means for monitoring an inertial force acting on a vehicle body to provide inertial force indicative data; and fourth means for receiving said wheel slippage representative data and said inertial force indicative data and for deriving said power distribution control signal by selectively utilizing one of said wheel slippage representative data and said inertial force indicative data, said fourth means selecting said wheel slippage representative data for deriving said power distribution control signal in a normal state of control and selecting said inertial force indicative data for deriving said power distribution control signal when hunting of power distribution control due to a fluctuation of wheel slippage is detected.

2. A power distribution control system as set forth in claim 1, which further comprises fifth means for monitoring a vehicular rolling state for generating a vehicular rolling indicative signal representative of the magnitude of rolling, and in which said third means monitors longitudinal acceleration acting on the vehicle body to provide longitudinal acceleration indicative data, said fourth means operating to derive said power distribution control signal utilizing said longitudinal acceleration indicative data and being responsive to said vehicular rolling indicative signal for modifying said power distribution control signal for reducing the distribution ratio for said secondary driving wheel at a predetermined rate according to an increase of the magnitude of vehicular rolling.

3. A power distribution control system as set forth in claim 1, wherein said fourth means detects said hunting in power distribution control on the basis of variation of said power distribution control signal.

4. A power distribution control system as set forth in claim 1, wherein said fourth means detects said hunting in power distribution conrol on the basis of a comparison between the vehicle speed and a wheel slippage determined by the rotational speeds of all wheels.

5. A power distribution control system as set forth in claim 1, wherein said transfer unit includes a friction clutch unit which is disposed between said engine output and said secondary driving wheel and controls engaging torque variably depending upon said power distribution control signal for adjusting the distribution ratio of the engine output power.

6. A system for controlling distribution of an output power of an internal combustion engine to a primary driving wheel, which is permanently connected to the engine output, for being driven by the engine output power, and a secondary driving wheel, which is connected to said engine output via a transfer unit so as to be releasably connected to said engine output, for receiving a portion of said engine output power at a controlled distribution ratio, said controlling system comprising:

first means, associated with said transfer unit, for operating said transfer unit in a controlled magnitude for adjusting a distribution ratio of said engine output power to said secondary wheel to a ratio defined by a power distribution control signal;

second means for monitoring wheel speed at said primary and secondary driving wheels and for generating primary and secondary driving wheel speed representative data;

third means for monitoring a longitudinal acceleration exerted on the vehicle body and for generating a longitudinal acceleration indicative data which is representative of a magnitude of said longitudinal acceleration; and fourth means for receiving said primary and secondary driving wheel speed representative data and said longitudinal acceleration indicative data and for deriving said power distribution control signal by selectively utilizing one of a wheel slippage derived on the basis of said primary and secondary driving wheel speed representative data and said longitudinal acceleration indicative data, said fourth means selecting said wheel slippage for deriving said power distribution control signal in a normal state of control and selecting said longitudinal acceleration indicative data for deriving said power distribution control signal when the state of occurrence of wheel slippage at both of said primary and secondary driving wheels is detected.

7. A power distribution control system as set forth in claim 6, which further comprises fifth means for monitoring a lateral acceleration exerted on the vehicle body for generating a lateral acceleration indicative data representative of a magnitude thereof, and said fourth means derives said power distribution control signal utilizing said longitudinal acceleration indicative data when said lateral acceleration representative data is smaller than a predetermined threshold value and derives said power distribution control signal on the basis of said longitudinal acceleration representative data and said lateral acceleration indicative data when said lateral acceleration representative data is greater than or equal to said pretetermined threshold value.

8. A power distribution control system as set forth in claim 5, wherein said fourth means detects occurrence of said wheel slippage at both of said primary and secondary driving wheels on the basis of variation of said power distribution control signal.

9. A power distribution control system as set forth in claim 6, wherein said fourth means detects occurrence of said wheel slippage at both of said primary and secondary driving wheels on the basis of a variation of wheel speed at each of said primary and secondary driving wheels compared to a vehicle body speed as monitored utilizing a vehicle body speed sensor.

10. A power distribution control system as set forth in claim 6, wherein said transfer unit employs a friction clutch unit which is disposed between said engine output and said secondary driving wheel and variably controls engaging torque depending upon said power distribution control signal for adjusting the distribution ratio of the engine output power.

11. A method for controlling distribution of an output power of an internal combustion engine to a primary driving wheel, which is permanently connected to the engine output, for being driven by the engine output power, and a secondary driving wheel, which is connected to said engine output via a transfer unit so as to be releasably connected to said engine output, for receiving a portion of said engine output power at controlled ratio, said controlling method comprising the steps of:

monitoring wheel slippage at least at said primary driving wheel and generating a wheel slippage magnitude representative data;

monitoring an inertial force acting on a vehicle body to generate inertial force indicative data;

receiving said wheel slippage representative data and said inertial force indicative data and deriving a power distribution control signal by selectively utilizing one of said wheel slippage representative data and said inertial force indicative data, in which said wheel slippage representative data is selected for deriving said power distribution control signal in a normal state of control and said inertial force indicative data is selected for deriving said power distribution control signal when hunting of power distribution control due to a fluctuation of wheel slippage is detected; and operating the transfer unit in a controlled magnitude for adjusting the distribution ratio of said engine output power for said secondary wheel at a ratio defined by said power distribution control signal.

12. A method as set forth in claim 11, which further comprises a step for monitoring vehicular rolling state for generating a vehicular rolling indicative signal representative of a magnitude of rolling, and derivation of said power distribution control signal is modified for reducing power distribution for said secondary driving wheel at a predetermined rate according to an increasing of the magnitude of vehicular rolling.

13. A method as set forth in claim 11, wherein detection of said hunting in power distribution control is made on the basis of variation of said power distribution control signal.

14. A method as set forth in claim 11, wherein said detection of said hunting in power distribution control is made on the basis of a variation of wheel slippage at each of said primary and secondary wheels compared to a vehicle body speed as monitored utilizing a vehicle body speed sensor.

15. A system for controlling distribution of output power of an internal combustion engine to, primary driving wheels which are permanently connected to an engine output and secondary driving wheels which are releasably connected to said engine output through a transfer unit, said system comprising:

first detecting means for detecting a rotational speed difference between the primary and secondary driving wheels to provide a signal indicative thereof;

first power distribution determining means, responsive to the signal from said first detecting means, for determining a first engine output power distribution ratio of the primary wheels to the secondary wheels in a preselected relation to the rotation speed difference detected by said first detecting means;

second detecting means for detecting an inertial force acting on a vehicle body to provide a signal indicative thereof;

second power distribution determining means, responsive to the signal from said second detecting means, for determining a second engine output power distribution ratio of the primary wheels to the secondary wheels in a preselected relation to the inertial force detected by said second detecting means;

third detecting means for detecting a hunting of power distribution control of the system to provide a signal indicative thereof; and power distribution control means for normally controlling the transfer unit to distribute the engine output power to the primary and secondary wheels at the first engine output power distribution ratio determined by said first power distribution determining means, said power distribution control means being responsive to the signal from said third detecting means to control the transfer unit to distribute the engine output power to the primary and secondary wheels at the second engine output power distribution ratio determined by said second power distribution detecting means when the hunting of power distribution controls occurs.

16. A power distribution control system as set forth in claim 15, wherein said second detecting means detects longitudinal acceleration acting on the vehicle body to provide the signal indicative thereof.

17. A power distribution control system as set forth in claim 16, wherein said second power distribution determining means determines the second engine power distribution ratio so that the distribution of engine output power to the secondary wheels is increased dependent upon an increase in said longitudinal acceleration.

18. A power distribution control system as set forth in claim 15, wherein said second detecting means detects lateral acceleration acting on the vehicle body to provide the signal indicative thereof.

19. A power distribution control system as set forth in claim 18, wherein said second power distribution determining means determines the second engine power distribution ratio so that the distribution of engine output power to the secondary wheels is reduced dependent upon an increase in said lateral acceleration.

20. A power distribution control system as set forth in claim 15, wherein said second detecting means includes first and second sensors, the first sensor monitoring longitudinal acceleration acting on the vehicle body, the second sensor monitoring lateral acceleration acting on the vehicle body, said second power distribution determining means determines the second engine output power distribution ratio of the primary wheels to the secondary driving wheels in the preselected relation to the longitudinal and lateral accelerations.

21. A power distribution control system as set fort in claim 15, wherein said power distribution control means is responsive to the signal from said third detecting means to select the greater of the first and second engine output power distribution ratios for controlling the transfer unit to distribute the engine output power to the primary and secondary driving wheels at the selected engine output power distribution ratio.

22. A power distribution control system as set forth in claim 15, wherein said first power distribution determining means so determines the first engine output power distribution ratio that the engine output power distribution to the secondary wheels is increased according to the increase in the rotational speed difference detected by said first detecting means.

23. A power distribution control system as set forth in claim 22, wherein said second detecting means includes first and second sensors, the first sensor monitoring longitudinal acceleration acting on the vehicle body, the second sensor monitoring lateral acceleration acting on the vehicle body, said second power distribution determining means determines the second engine output power distribution ratio that when the lateral acceleration is greater than a first threshold value, the engine power distribution to the secondary driving wheels is set to zero, when the lateral acceleration is smaller than the first threshold value and the longitudinal acceleration is smaller than a second threshold value, the engine output power distribution to the secondary driving wheels is set to zero, and when the lateral acceleration is smaller than the first threshold value and the longitudinal acceleration is greater than a third threshold value which is greater than the second threshold value, the engine output power distribution to the secondary driving wheels is set to a value equal to that of the primary wheels, and when the lateral acceleration is smaller than the first threshold value and the longitudinal acceleration ranges between the second and third threshold value, the engine output power distribution to the secondary driving wheels is increased at a preselected ratio according to the increase in said longitudinal acceleration.

24. A power distribution control system as set forth in claim 22, wherein said second detecting means includes first and second sensors, the first sensor monitoring longitudinal acceleration ($Xg$) acting on the vehicle body, the second sensor monitoring lateral acceleration ($Yg$) acting on the vehicle body, said second power distribution determining means so determining the second engine output power distribution ratio that, assuming that an acceleration variable ($G$) is provided by a relation of $G = Xg - K \times Yg$, where K is a constant, when G is smaller than zero, the engine output power distribution to the secondary driving wheels is set to zero, when G ranges between zero and a preselected value which is greater than zero, the engine output power distribution to the secondary driving wheels is increased at a preselected ratio according to an increase of G, and when G is greater than the preselected value, the engine output power distribution to the secondary driving wheels is equal to that of the primary driving wheels.

25. A power distribution control system as set forth in claim 23, wherein the transfer unit includes a friction clutch having variable engaging force to establish engagement between the secondary driving wheels and the engine output, said power distribution control means providing a control signal to the friction clutch to control the engagement between the secondary driving wheels and the engine output according to the engine output power distribution ratio.

26. A power distribution control system as set forth in claim 24, wherein the transfer unit includes a friction clutch having variable engaging force to establish engagement between the secondary driving wheels and the engine output, said power distribution control means providing a control signal to the friction clutch to control the engagement between the secondary driving wheels and the engine output according to the first and second engine output power distribution ratios.

27. A power distribution control system as set forth in claim 15, wherein said third detecting means compares a vehicle body speed and the rotational speeds of the primary and secondary wheels to detect wheel slippage of all wheels for determining occurrence of said hunting.

28. A power distribution control system as set forth in claim 22, wherein said second detecting means includes first and second sensors, the first sensor monitoring longitudinal acceleration ($Xg$) acting on the vehicle body, the second sensor monitoring the substraction of a preselected value from the lateral acceleration acting on the vehicle body ($Yg'$), said second power distribution determining means determines the second engine output power distribution ratio that, assuming that an acceleration variable ($G$) is provided by a relation of $G = Xg - K \times Yg'$, where K is a constant, when G is smaller than zero, the engine output power distribution to the secondary driving wheels is set to zero, when G ranges between zero and a preselected value which is greater than zero, the engine output power distribution to the secondary driving wheels is increased at a preselected ratio according to an increase of G, and when G is greater than the preselected value, the engine output power distribution to the secondary driving wheels is equal to that of the primary driving wheels.

* * * * *